(12) United States Patent
Larouche et al.

(10) Patent No.: US 12,420,338 B2
(45) Date of Patent: *Sep. 23, 2025

(54) METAL POWDER ATOMIZATION MANUFACTURING PROCESSES

(71) Applicant: AP&C ADVANCED POWDERS & COATINGS INC., Boisbriand (CA)

(72) Inventors: Frédéric Larouche, Île Bizard (CA); Frédéric Marion, Montréal (CA); Matthieu Balmayer, Montréal (CA)

(73) Assignee: AP&C ADVANCED POWDERS & COATINGS INC., Boisbriand (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,345

(22) Filed: Dec. 31, 2024

(65) Prior Publication Data

US 2025/0128323 A1 Apr. 24, 2025

Related U.S. Application Data

(63) Continuation of application No. 18/786,757, filed on Jul. 29, 2024, which is a continuation of application
(Continued)

(51) Int. Cl.
*B22F 9/08* (2006.01)
*B01J 2/02* (2006.01)
(Continued)

(52) U.S. Cl.
CPC ............... *B22F 9/082* (2013.01); *B01J 2/02* (2013.01); *B22F 1/052* (2022.01); *B22F 1/14* (2022.01);
(Continued)

(58) Field of Classification Search
CPC ...................................................... B22F 9/082
See application file for complete search history.

(56) References Cited

U.S. PATENT DOCUMENTS

| 3,041,672 A | 7/1962 | Lyle |
| 3,172,753 A | 3/1965 | Walsh |

(Continued)

FOREIGN PATENT DOCUMENTS

| CA | 2383861 A1 | 3/2001 |
| CA | 2399581 A1 | 8/2001 |

(Continued)

OTHER PUBLICATIONS

Allen et al., "Relative positive-ion yields from Transition-metal Oxide Systems under Dynamic Secondary Ion Mass Spectrometry Conditions", Journal of the Chemical Society, 1991, 87(6), pp. 875-883.

(Continued)

*Primary Examiner* — Jophy S. Koshy
*Assistant Examiner* — Joshua S Carpenter
(74) *Attorney, Agent, or Firm* — Dority & Manning, P.A.

(57) ABSTRACT

There are provided reactive metal powder atomization manufacturing processes. For example, such processes include providing a heated metal source and contact the heated metal source with at least one additive gas while carrying out the atomization process. Such processes provide raw reactive metal powder having improved flowability. The at least one additive gas can be mixed together with an atomization gas to obtain an atomization mixture, and the heated metal source can be contacted with the atomization mixture while carrying out the atomization process. Reactive metal powder spheroidization manufacturing processes are also provided.

17 Claims, 7 Drawing Sheets

Related U.S. Application Data

No. 15/772,418, filed as application No. PCT/CA2016/051240 on Oct. 27, 2016, now abandoned.

(60) Provisional application No. 62/247,794, filed on Oct. 29, 2015.

(51) Int. Cl.
    *B22F 1/052*     (2022.01)
    *B22F 1/14*     (2022.01)
    *B22F 1/16*     (2022.01)
    *B22F 9/04*     (2006.01)
    *B22F 9/14*     (2006.01)
    *C22C 1/04*     (2023.01)

(52) U.S. Cl.
    CPC ................ *B22F 1/16* (2022.01); *B22F 9/04* (2013.01); *B22F 9/14* (2013.01); *B22F 2009/0824* (2013.01); *B22F 2009/0828* (2013.01); *B22F 2009/0848* (2013.01); *B22F 2201/02* (2013.01); *B22F 2201/03* (2013.01); *B22F 2201/04* (2013.01); *B22F 2201/50* (2013.01); *B22F 2202/13* (2013.01); *B22F 2998/10* (2013.01); *B22F 2999/00* (2013.01); *C22C 1/0408* (2013.01); *C22C 1/0416* (2013.01); *C22C 1/0458* (2013.01)

(56) References Cited

U.S. PATENT DOCUMENTS

| | | | |
|---|---|---|---|
| 3,347,698 A | 10/1967 | Ingham, Jr. |
| 3,891,824 A | 6/1975 | Essers et al. |
| 3,944,412 A | 3/1976 | Liu |
| 4,022,872 A | 5/1977 | Carson et al. |
| 4,095,081 A | 6/1978 | Ashman |
| 4,105,437 A | 8/1978 | Liu |
| 4,374,075 A | 2/1983 | Yolton et al. |
| 4,519,835 A | 5/1985 | Gauvin et al. |
| 4,544,404 A | 10/1985 | Yolton et al. |
| 4,631,013 A | 12/1986 | Miller |
| 4,690,796 A | 9/1987 | Paliwal |
| 4,788,394 A | 11/1988 | Vanneste et al. |
| 4,788,402 A | 11/1988 | Browning |
| 4,982,410 A | 1/1991 | Mustoe et al. |
| 5,084,091 A | 1/1992 | Yolton |
| 5,114,471 A | 5/1992 | Johnson et al. |
| 5,120,352 A | 6/1992 | Jackson et al. |
| 5,147,448 A | 9/1992 | Roberts et al. |
| 5,176,874 A | 1/1993 | Mourer et al. |
| 5,176,938 A | 1/1993 | Wallsten et al. |
| 5,198,017 A | 3/1993 | Mourer et al. |
| 5,200,595 A | 4/1993 | Boulos et al. |
| 5,213,610 A | 5/1993 | Yolton et al. |
| 5,277,705 A | 1/1994 | Anderson et al. |
| 5,284,329 A | 2/1994 | Hohman et al. |
| 5,294,242 A | 3/1994 | Zurecki et al. |
| 5,340,377 A | 8/1994 | Accary et al. |
| 5,357,075 A | 10/1994 | Muehlberger |
| 5,368,657 A | 11/1994 | Anderson et al. |
| 5,372,629 A | 12/1994 | Anderson et al. |
| 5,442,153 A | 8/1995 | Marantz et al. |
| 5,480,470 A | 1/1996 | Miller et al. |
| 5,480,471 A | 1/1996 | Kim et al. |
| 5,529,292 A | 6/1996 | Accary et al. |
| 5,707,419 A | 1/1998 | Tsantrizos et al. |
| 5,808,270 A | 9/1998 | Marantz et al. |
| 5,846,600 A | 12/1998 | Yamada et al. |
| 5,855,642 A | 1/1999 | Miller et al. |
| 5,932,346 A | 8/1999 | Kent et al. |
| 5,935,461 A | 8/1999 | Witherspoon et al. |
| 5,939,151 A | 8/1999 | Prichard et al. |
| 5,940,674 A | 8/1999 | Sachs et al. |
| 5,989,648 A | 11/1999 | Phillips |
| 6,142,382 A | 11/2000 | Ting et al. |
| 6,146,567 A | 11/2000 | Sachs et al. |
| 6,365,867 B1 | 4/2002 | Hooper |
| 6,398,125 B1 | 6/2002 | Liu et al. |
| 6,444,009 B1* | 9/2002 | Liu ............... B22F 9/082 |
| | | | 75/332 |
| 6,582,763 B1 | 6/2003 | Nishimura et al. |
| 6,596,224 B1 | 7/2003 | Sachs et al. |
| 6,693,264 B2 | 2/2004 | Anderhuber et al. |
| 6,744,006 B2 | 6/2004 | Johnson et al. |
| 6,770,369 B1 | 8/2004 | Oyamada et al. |
| 6,780,219 B2 | 8/2004 | Singh et al. |
| 7,022,155 B2 | 4/2006 | Deegan et al. |
| 7,131,597 B2 | 11/2006 | Scattergood |
| 7,198,657 B2 | 4/2007 | Tornberg |
| 7,431,750 B2 | 10/2008 | Liao et al. |
| 7,547,346 B2 | 6/2009 | Sekine |
| 7,572,315 B2 | 8/2009 | Boulos et al. |
| 7,582,135 B2 | 9/2009 | Nakamura et al. |
| 7,628,838 B2 | 12/2009 | Walter et al. |
| 7,678,339 B2 | 3/2010 | Wira |
| 7,753,989 B2 | 7/2010 | Ernst et al. |
| 7,803,235 B2 | 9/2010 | Venigalla |
| 7,931,836 B2 | 4/2011 | Xie et al. |
| 7,943,084 B1 | 5/2011 | Johnson et al. |
| 7,967,891 B2 | 6/2011 | Paserin et al. |
| 7,981,190 B2 | 7/2011 | Nakamura et al. |
| 8,518,358 B2 | 8/2013 | Xie et al. |
| 8,821,610 B2 | 9/2014 | Baudis |
| 8,859,931 B2 | 10/2014 | Boulos et al. |
| 9,650,309 B2 | 5/2017 | Anderson et al. |
| 9,718,131 B2 | 8/2017 | Boulos et al. |
| 9,751,129 B2 | 9/2017 | Boulos et al. |
| 9,833,837 B2 | 12/2017 | Heidloff et al. |
| 9,956,615 B2 | 5/2018 | Hanusiak et al. |
| 9,981,315 B2 | 5/2018 | Rieken et al. |
| 11,198,179 B2 | 12/2021 | Larouche et al. |
| 11,235,385 B2 | 2/2022 | Larouche et al. |
| 11,258,093 B2 | 2/2022 | Yoo et al. |
| 2001/0054784 A1 | 12/2001 | Tornberg |
| 2002/0125591 A1 | 9/2002 | Jaynes et al. |
| 2002/0168466 A1 | 11/2002 | Tapphorn et al. |
| 2003/0080097 A1 | 5/2003 | Boulos et al. |
| 2005/0028642 A1 | 2/2005 | Mooney et al. |
| 2005/0050993 A1 | 3/2005 | Scattergood |
| 2005/0118090 A1 | 6/2005 | Shaffer et al. |
| 2007/0102663 A1 | 5/2007 | Xiao et al. |
| 2007/0130656 A1 | 6/2007 | Boulos et al. |
| 2009/0260481 A1 | 10/2009 | Boulos et al. |
| 2010/0139815 A1 | 6/2010 | Pandey |
| 2011/0253815 A1 | 10/2011 | Voice |
| 2012/0160813 A1 | 6/2012 | Kowalsky et al. |
| 2012/0201860 A1 | 8/2012 | Weimer et al. |
| 2012/0261390 A1 | 10/2012 | Boulos et al. |
| 2012/0325051 A1 | 12/2012 | Watson |
| 2013/0030205 A1 | 1/2013 | Jackson et al. |
| 2013/0255443 A1 | 10/2013 | Han et al. |
| 2013/0255445 A1 | 10/2013 | Boulos et al. |
| 2013/0306205 A1 | 11/2013 | Anderson et al. |
| 2014/0373679 A1 | 12/2014 | Heidloff et al. |
| 2015/0284534 A1 | 10/2015 | Thierry et al. |
| 2016/0175936 A1* | 6/2016 | Boulos ............... H05H 1/38 |
| | | | 75/346 |
| 2016/0323987 A1 | 11/2016 | Boulos et al. |
| 2016/0381777 A1 | 12/2016 | Boulos et al. |
| 2017/0106448 A1 | 4/2017 | Boulos et al. |
| 2017/0209923 A1 | 7/2017 | Giovannetti et al. |
| 2017/0211167 A1 | 7/2017 | Li et al. |
| 2017/0326649 A1 | 11/2017 | Boulos et al. |
| 2018/0169763 A1 | 6/2018 | Dorval Dion et al. |

FOREIGN PATENT DOCUMENTS

| | | |
|---|---|---|
| CA | 2364172 A1 | 6/2002 |
| CA | 2538239 A1 | 3/2005 |
| CA | 2912282 A1 | 9/2015 |
| CA | 3003502 A1 | 5/2017 |
| CN | 1709585 A | 12/2005 |
| CN | 1874838 A | 12/2006 |

(56) References Cited

FOREIGN PATENT DOCUMENTS

| | | |
|---|---|---|
| CN | 102094163 A | 6/2011 |
| CN | 103223492 A | 7/2013 |
| CN | 103433499 A | 12/2013 |
| CN | 103752822 A | 4/2014 |
| CN | 103769594 A | 5/2014 |
| CN | 103846447 A | 6/2014 |
| JP | S49025554 B | 7/1974 |
| JP | S60255906 A | 12/1985 |
| JP | S63266001 A | 11/1988 |
| JP | H06264115 A | 9/1994 |
| JP | H10330806 A | 12/1998 |
| JP | 2001/226704 A | 8/2001 |
| JP | 2004/091843 A | 3/2004 |
| JP | 2010/018825 A | 1/2010 |
| JP | 2010/019608 A | 1/2010 |
| JP | 2011/089212 A | 5/2011 |
| KR | 2013/0043599 A | 4/2013 |
| KR | 101516258 B1 | 5/2015 |
| WO | WO87/05548 A1 | 9/1987 |
| WO | WO87005548 A1 | 9/1987 |
| WO | WO2011/054113 A1 | 5/2011 |
| WO | WO2015/135075 A1 | 9/2015 |
| WO | WO2016/191854 A1 | 12/2016 |

OTHER PUBLICATIONS

Al-Sabouni, "Reactive Plasma Spraying", PhD Thesis, Cranfield University Library, 1999.

American Society for Testing and Materials, "Standard Terminology Relating to Surface Analysis (E673-90)", Surface and Interface Analysis, vol. 17, 1991, 8 Pages.

Anderson et al., "Atomization and Powder Processing of High Temperature Ferritic Stainless Steel", Metals Development, Ames Lab, Iowa State University, 2011, 11 Pages.

Arita et al., "Depth Profile Measurement by Secondary Ion Mass Spectrometry for Determining the Tracer Diffusivity of Oxygen in Rutile", Journal of The American Ceramic Society, vol. 62, No. 9-10, 1979, pp. 443-446.

Bardi et al., "Sputer depth profiling by secondary ion mass spectrometry coupled with sample current measurements", Applied Surface Science, 252 (2006), pp. 7373-7382.

Benninghoven et al, "Tandem Mass Spectrometer for Secondary Ion Studies", The Review of Scientific Instruments, vol. 42, No. 1, Jan. 1971, 5 Pages.

Benninghoven et al., "Detection, Identification and Structural Investigation of Biologically Important Compounds by Secondary Ion Mass Spectrometry", Analytical Chemistry, 1978, 60(8), pp. 1180-1184.

Benninghoven et al., "SIMS and FAB of Biomolecules and Pharmaceuticals: A Comparison", Secondary Ion Mass Spectrometry SIMS VII, pp. 371-374.

Benninghoven, "Chemical Analysis of Inorganic and Organic Surfaces and Thin Films by Static Time-of-Flight Secondary Ion Mass Spectrometry (TOF-SIMS)", Angew. Chem. Int. Ed. Engl. 1994, 33, pp. 1023-1043.

Bignon et al., "Corrosion of titanium alloys in primary water of nuclear pressurised water reactor", Corrosion Science, Elsevier (2018), 150, pp. 32-41.

Boulos, "Radio Frequency Developments, Scale-Up and Industrial Applications", High Temp. Chem. Processes, 1992, 401-411.

Boulos, "Thermal Plasma Processing", IEEE Transactions on Plasma Science, 1991, pp. 1078-1089.

Brockman et al., "Estimation of grain boundary diffusivity in near-α titanium polycrystals", Scripta Materialia 65, (2011), pp. 513-515.

Broderick et al., "The Effect of Cooling Conditions on the Microstructure of Rapidly Solidified Ti-6A1-4V", Metallurgical Transactions A, vol. 16A, Nov. 1985, pp. 1951-1959.

Broumas et al., "Oxygen Diffusion into Titanium", Proceedings of the 2003 American Society for Engineering Education Annual Conference and Exposition, 2003.

Chaze et al., "Influence of alloying elements on the dissolution of oxygen in the metallic phase during the oxidation of titanium alloys", Journal of Materials Science, 22 (1987), pp. 1206-1214.

Chu et al., "Solid-State Standard Addition Method in Secondary Ion Mass Spectrometry for Improvement of Detection Limits", Analytical Chemistry, 1982, 54, pp. 2111-2113.

Cogswell, "Quantification of Ion Diffusion in Gallium Arsenide-Based spintronic Light-Emi☐ng Diode Devices Using Time-of-Flight Secondary Ion Mass Spectrometry", Department of Chemistry, University at Buffalo, pp. 174-175 (197 Pages total).

Colton, "Secondary Ion Mass Spectrometry: High-Mass Molecular and Cluster Ions", Nuclear Instruments and Methods, Physics Research, 218 (1983), pp. 276-286.

Coutanceau et al., "Stokes flow inside and around drop distorted by the presence of tube wall", Fluid Dynamics Research, vol. 1, 1986, pp. 107-117 (Abstract Only).

De Souza et al., "Determining oxygen isotope profiles in oxides with Time-of-Flight SIMS", Solid State Ionics, 176 (2005), pp. 1465-1471.

Dignard et al., "Ceramic and Metallic Powder Spheroidization Using Indution Plasma Technology", Proceedings United Thermal Spray Conference, 1997, 1-7.

Du et al., " Air Oxidation Behaviour of the Ti—6Al—4V Alloy Between 650 and 850° C.", Corrosion Science, vol. 36, No. 4, 1994. pp. 631-642.

Giannuzzi et al., "Introduction to Focused Ion Beams, Instrumentation, Theory, Techniques and Practice", Springer, 2004, 160 Pages.

Gil et al., "Formation of a-Widmanstaten "structure: effects of grain size and cooling rate on the Widmanstaten" morphologies and on the mechanical properties in Ti6Al4V alloy", Journal of Alloys and Compounds, 329 (2001), pp. 142-152.

Goacher et al., "Analysis of C60+ and Cs+ sputering ions for depth profiling gold/silicon and GaAs multilayer samples by time of flight secondary ion mass spectrometry", Applied Surface Science, 2010, 256, pp. 2044-2051.

Grasserbauer, "Quantitative Secondary Ion Mass Spectrometry", Accuracy in Trace Analysis, Journal of Research of the National Bureau of Standards, vol. 93, No. 3, May-Jun. 1988, 510-518.

Hofmann, "High resolution compositional depth profiling", Journal of Vacuum Science & Technology, 1991, 9(3), pp. 1466-1476.

Houssiau et al., "Molecular depth profiling of polymers with very low energy reactive ions", Surface Interface Analysis, 2010, 42, pp. 1402-1408.

Iacob et al., "Development of nanoroughness under SIMS ion sputering of germanium surfaces", Surface Interface Analysis, 2013, 45, pp. 409-412.

Jiang et al., "Induction Plasma Reactive Deposition of Tungsten Carbide from Tungsten Metal Powder", ACTA Metallurgica Sinica, vol. 13, No. 5 2001, 352-358.

Karlsson et al., "Surface oxidation behavior of Ti—6Al—4V manufactured by Electron Beam Melting (EBM®)", Journal of Manufacturing Processes (2015) 17, pp. 120-126.

Kilner et al., "The isotope exchange depth profiling (IEDP) technique using SIMS and LEIS", J Solid State Electrochem, (2011), pp. 861-876.

Kofstad et al., "High-Temperature Oxidation of Titanium", Journal of the Less-Common Metals, 12 (1967), pp. 449-464.

Kyocera SGS Europe, "Ti 6Al 4V (Grade 5) Titanium Alloy Data Sheet", Solid Carbide Tools, 2022, 3 Pages.

Lausmaa, "Surface Oxides on Titanium: Preparation, Characterization and Biomedical Applications", Chalmers University and University of Göteborg, 1991, Abstract and p. 18-20.

Lehoczky et al., "Oxidation of Thin Titanium Films in Ambient Conditions", Thin Solid Films, 55 (1978), pp. 125-135.

Li et al., "Thermal expansion of liquid Ti—6Al—4V measured by electrostatic levitation", Applied Physics Leters 89,111913 (2006), 2 Pages.

Lin, "Reactive Atomization and Deposition Process: Fundamentals Mechanisms", Dissertation, University of California Irvine, 2003, 261 Pages.

(56) References Cited

OTHER PUBLICATIONS

Lütjering et al., "Microstructure and Mechanical Properties of Titanium Alloys", Microstructure and Mechanical Properties of Titanium Alloys, vol. 2, Chapter 1, 2000, 91 Pages.

Malmberg et al., "Methods for the analysis of the composition of bone tissue, with a focus on imaging mass spectrometry (TOF-SIMS)", Proteomics, 2008, 8, pp. 3755-3762.

Marmitt et al., "Oxygen diffusion in TiO2 films studied by electron and ion Rutherford backscatering", Thin Solid Films, (2017) 629, pp. 97-102.

Masudome et al., "Chemical depth profiling of copper oxide film by ToF-SIMS using Bi3++ cluster", SIMS Proceedings Papers, Surface Interface Analysis, 2011, 43, pp. 664-668.

Mathiak et al., "Diffusion in liquid metals", Journal of Non-Crystalline Solids, vol. 205-207 (1996), pp. 412-416 (Abstract Only).

Meyer, "Advanced Gas Atomization Production of Oxide Dispersion Strengthened (ODS) Ni-Base Superalloys Through Process and Solidification Control", Iowa State University Digital Repository, 2013, 134 Pages.

Milillo et al., "Image fusion combining SEM and ToF-SIMS images", Surface Interface Analysis, 2015, 47, pp. 371-376.

Milillo et al., "Spatial Analysis of Time of Flight-Secondary Ion Mass Spectrometric Images by Ordinary Kriging and Inverse Distance Weighted Interpolation Techniques", Anal. Chem., 2008, 80, pp. 4896-4905.

Millot et al., "Oxygen Self-Diffusion In Non-Stoichiometric RutileTiO2-x at High Temperature", Solid State Ionics, 28-30 (1988), pp. 1344-1348.

Mindel et al., "The Room Temperature Oxidation of Titanium Thin Films", ACTA Metallurgica, vol. 17, 1969, pp. 1441-1448.

Miyasaka et al., "Ar cluster ion beam sputering of InSb investigated by ToF-SIMS", SIMS proceedings paper, Surface Interface Analysis, 2014, 46, pp. 261-263.

Mizuno et al., "Temperature dependence of oxide decomposition on titanium surfaces in ultrahigh vacuum", Journal of Vacuum Science & Technology A 20, 1716 (2002), 7 Pages.

Molodetsky et al., "Phases of Titanium Combustion in Air", Combustion and Flame (1998), pp. 522-532.

Moradian et al., "Measurement of Surface Tension, Viscosity, and Density at High Temperatures by Free-Fall Drop Oscillation", Metallurgical and Materials Transactions B, 2008, 11 Pages.

Muhammad et al., "Effect of heat treatments on microstructure/small-scale properties of additive manufactured Ti—6Al—4V", The International Journal of Advanced Manufacturing Technology (2019), pp. 4161-4172.

Murase et al., "An effect of measurement conditions on the depth resolution for low-energy dual-beam depth profiling using TOF-SIMS", Surface Interface Analysis, 2013, 45, pp. 1261-1265.

Murray et al. "The O—Ti (Oxygen-Titanium) System", Bulletin of Alloy Phase Diagrams, vol. 8, No. 2, 1987, pp. 148-165.

Omoniyi et al., "Heat Treatments of Ti6Al4V Alloys for Industrial Applications: An Overview", IOP Conf. Ser.: Materials Science and Engineering, International Conference on Engineering for Sustainable World, 2021, 8 Pages.

Oswald, "X-ray Photoelectron Spectroscopy in Analysis of Surfaces", Encyclopedia of Analytical Chemistry, 2013, 49 Pages.

Pantano et al., "Secondary Ion Mass Spectroscopy", ASM Handbook, vol. 10, Materials Characterization, 2019 pp. 739-756.

Peter et al., "Near Net Shape Manufacturing of New, Low Cost Titanium Powders for Industry", Oak Ridge National Laboratory, Materials Science and Technology Division, 2013, 118 Pages.

Postawa et al., "Enhancement of Sputering Yields Due to C60 versus Ga Bombardment of Ag{111} as Explored by Molecular Dynamics Simulations", Anal. Chem., 2003, 75, pp. 4402-4407.

Proulx et al., "Plasma-Particle Interaction Effects in Induction Plasma Modelling Under Dense Loading Conditions", International Journal of Heat and Mass Transfer (1985), 28, pp. 1327-1336.

Pryds et al., "A quasi-stationary numerical model of atomized metal droplets. II: Prediction and assessment", Modelling Simul. Mater. Sci. Eng. 7 (1999), pp. 431-446.

Rabbani et al., "TOF-SIMS with Argon Gas Cluster Ion Beams: A Comparison with C60+", Analytical Chemistry, American Chemical Society, 2011, 83, pp. 3793-3800.

Rieken et al., "Reactive Gas Atomization Processing for Fe-Based ODS Alloys", Journal of Nuclear Materials, 2012, 11 Pages.

Rosa, "Oxygen Diffusion in Alpha and Beta Titanium in the Temperature Range of 932° to 1142° C.", Metallurgical Transactions, vol. 1, Sep. 1970, pp. 2517-2522.

Sachs et al., "Three-Dimensional Printing: The Physics and Implications of Additive Manufacturing", Annals of CIPR, vol. 42, Jan. 1993, pp. 257-260.

Samimi et al., "On the influence of alloy composition on the oxidation performance and oxygen-induced phase transformations in Ti-(0-8) wt% Al alloys", J Mater Sci (2016) 51, pp. 3684-3692.

Schade et al., "Atomization" chapter, ASM Handbook vol. 7, Powder Metallurgy, ASM International, 2015, 58-71.

Seeley et al., "Apparatus for statistical studies of heterogeneous nucleation", Review of Scientific Instruments 70, 3664 (1999), pp. 3664-3667.

Sekiguchi et al., "Preparation of Ag/Al2O3 Nanocomposite Using Suspension Plasma Spraying: a Feasibility Study", Transactions of the Materials Research Society of Japan, 2002, 59-61.

Shaikh et al., "Effect of Temperature and Cooling Rates on the $\alpha+\beta$ Morphology of Ti—6Al—4V Alloy", Procedia Structural Integrity 14 (2019), pp. 782-789.

Sieniawski et al., "Microstructure and Mechanical Properties of High Strength Two-Phase Titanium Alloys", IntechOpen, 2013, 69-80.

Song et al., "Diffusion of oxygen in $\beta$-titanium", Scripta Materialia 59 (2008), pp. 623-626.

Soucy et al., "Parametric Study of the Plasma Synthesis of Ultrafine Silicon Nitride Powders", Journal of Materials Science, 1995, 2008-2018.

Spicher, "Effects of Aluminum Additions to Gas Atomized Reaction Synthesis Produced Oxide Dispersion Strengthened Alloys", Iowa State University Digital Repository, Graduate Theses and Dissertations, 2014, 127 Pages.

Steinmetz, "Investigation of a Novel Passivation Technique for Gas Atomized Magnesium Powders", Iowa State University Digital Repository, 2011, 114 Pages.

Stevie, "Secondary Ion Mass Spectrometry: Applications for Depth Profiling and Surface Characterization", Application for Depth Profiling and Surface Characterization, Momentum Press, 2015, Chapters 2 & 3, 52 Pages.

Sun et al. "Comparison of virgin Ti—6Al—4V powders for additive manufacturing", Additive Manufacturing, 2018, pp. 544-555.

Sun et al., "Investigation of the Cutting Forces and Tool Wear in Laser Assisted Milling of Ti6Al4V Alloy", Proceedings of the 36th International MATADOR Conference, 2010.

*Tekna Plasma Systems Inc. v. AP&C Advanced Powders & Coatings Inc.*, Docket T-126-19, Citation 2024 FC871, Jun. 2024, 244 Pages.

Unocic et al., "Effect of gallium focused ion beam milling on preparation of aluminium thin foils", Journal of Microscopy, vol. 240, Pt 3, 2010, p. 227-238.

Vache et al., "Oxygen Diffusion Modeling in Titanium Alloys: New Elements on the Analysis of Microhardness Profiles", Oxidation of Metals, (2020) 93 (1-2), pp. 215-227.

Van Vaeck, et al., "Static Secondary Ion Mass Spectrometry: (S-SIMS) Part 1. Methodology and Structural Interpretation", Mass Spectrometry Reviews, 1999, 18, pp. 1-47.

Vardelle et al., "Spray Parameters and Particle Behavior Relationships During Plasma Spraying" Journal of Thermal Spray Technology, vol. 2(1), 1993, pp. 79-91.

Venkateshan, "Chapter 2 Steady Conduction in One Dimension", Heat Transfer, Third Edition, Springer 2021, 88 Pages.

Vickerman, "Molecular imaging and depth profiling by mass spectrometry—SIMS, MALDI or DESI?", Analyst, 2011, 136, pp. 2199-2217.

(56) References Cited

OTHER PUBLICATIONS

Wall, "New automated plant grows Montreal aerospace cluster", Daily Commercial News, Aug. 2016, 5 Pages.
Wang et al., "ToF-SIMS depth profiling of insulating samples, interlaced mode or non-interlaced mode?", Surface Interface Analysis, SIMS proceedings paper, 2014, 46, pp. 257-260.
Williams et al., Transmission Electron Spectroscopy, A Textbook for Materials Science, 1996 by Plenum Press, 23 Pages.
Xia et al., "Review of the Effect of Oxygen on Titanium and Deoxygenation Technologies for Recycling of Titanium Metal", Recycling Methods for Industrial Metals and Minerals, JOM, (2019) vol. 71, No. 9, pp. 3209-3220.
Yolton et al., "Conventional titanium powder production", Titanium Powder Metallurgy, 2015, pp. 21-32.
Zhu et al., "Gelatin Calibration Standards for Quantitative Ion Microprobe Analysis of Biological Tissues", Analytical Chemistry, 1982, 54, pp. 419-422.
Zinner, "Depth Profiling by Secondary Ion Mass Spectrometry", Scanning, Review, 1980, vol. 3, 28 Pages.
Prior art filed under Section 34.1 of the Patent Act for CA3003502.
ALD Vacuum Technologies GmbH, Ceramic Free Metal Powder Production for Reactive and Refractory Metals, 2011, 4 pages. *The year of publication is sufficiently earlier than the effective US Filing date, so the particular month of gublication is not an issue.*
ALD AMG Vacuum Technologies GmbH, Metal Powder Technology, Sep. 13, 2010.
ALD Vacuum Technologies GmbH, Comparison Between EIGA 50-500 (Standard) and EIGA 100-1000 (Designed), 2011. *The year of publication is sufficiently earlier than the effective US Filing date, so the particular month of gublication is not an issue.*
ALD Vacuum Technologies GmbH, Sample Information for One (1) Inert Gas Atomization Plan Type EIGA 50-500—for Ceramic-Free Batch Atomization of up to 10 lbs of Titanium Alloy, 2011. *The year of publication is sufficiently earlier than the effective US Filing date, so the particular month of gublication is not an issue.*
Antony et al., Processes for Production of High-Purity Metal Powders, JOM, 2003, 14-18.
AP&C Advanced Powders and Coatings, Ti—6Al—4V (45-106 µm) Specification Sheet, 2014. *The year of publication is sufficiently earlier than the effective US Filing date, so the particular month of gublication is not an issue.*
Apichayakul et al., Correlations Between In-Flight Particle, Splat and Coating Microstructures of Ni20Cr Prepared by Flame and Arc Spray Processes, Department of Physics Faculty of Science, Thailand, 2007. *The year of publication is sufficiently earlier than the effective US Filing date, so the particular month of gublication is not an issue.*
Attalla, Characterization of Titanium Metal Powder by Pulsed NMR, Mound Facility, Ohio, 1977, 20 Pages.
Axelsson, Surface Characterization of Titanium Powders with X-Ray Photoelectron Spectroscopy, Diploma Work No. 103/2012 at Department of Material Manufacturing Technology, Sweden, 64 pages. *The year of publication is sufficiently earlier than the effective US Filing date, so the particular month of gublication is not an issue.*
Biotip, Final Report Injection Moulding of Titanium Powders for Biomedical Applications, Project ID 17991, 2017, 23 pages.
Boulos, Induction Plasma Synthesis and Processing of Nanostructured Materials, IMP2002, Japan, Nov. 2002, 10 pages.
Boulos, Plasma Power Can Make Better Powders, Metal Powder, MFR May 2004, 16-21.
Boulos, Thermal Plasma Processing, IEEE Transactions on Plasma Science, vol. 19, No. 6, 1991, 12 pages.
Choquet et al., Electric Welding Arc Modeling with the Solver OpenFOAM—A Comparison of Different Electromagnetic Models, Doc 212-1189-11, University West Department of Science, Sweden, 2015, 17 pages.
Egry et al., Surface Tension and Viscosity of Liquid Metals, Journal of Non-Crystalline Solids, vol. 156-158, Part 2, May 1993, 830-832.
Entezarian et al., Plasma Atomization: A New Process for the Production of Fine, Spherical Powders, vol. 48, , JOM, Jun. 1996, 53-56.
Entezarian et al., Reactive Plasma Spray Forming of Al—TiAl3 Composites Using a Triple Plasma System, Doctor of Philosophy thesis Faculty of Graduate Studies and Research of McGill University, Canada, published in Jun. 2017.
Fauchais et al., Thermal Sprayed Coatings Used Against Corrosion and Corrosive Wear, Advanced Plasma Spray Applications, France, 37 pages. http://www.intechopen.com/books/advanced-plasma-spray-applications/thermal-sprayed-coatings-used-against-corrosion-and-corrosive-wear.
Federal Court between TEKNA Plasma Systems Inc. and AP & C Advanced Powders & Coatings Inc., Statement of Claim filed on Jan. 16, 2019.
Horner et al., The Effect of Process Parameters on Twin Wire Arc Spray Pattern Shape, Coatings, vol. 5, 2015, 115-123.
Huang et al., The Manufacture of Spherical Titanium Alloy Powder in Plasma, IOP Conference Series: Materials Science and Engineering, vol. 62, 2014, 012011, 5 pages. The year of publication is sufficiently earlier than the effective US Filing date, so the particular month of publication is not an issue.
Jiang et al., Effect of Process Parameters on Induction Plasma Reactive Deposition of Tungsten Carbide from Tungsten Metal Powder, Trans Nonferrous Met Society China, vol. 11, No. 5, 2001, 639-643.
Jiang et al., Induction Plasma Reactive Deposition of Tungsten Carbide from Tungsten Metal Powder, ACTA Metallurgica Sinca (English Letters), vol. 14, No. 5, 2001, 350-358.
Jiang et al., Reactive Deposition of Tungsten and Titanium Carbides by Induction Plasma, Journal of Materials Science, 30, 1995, 2325-2329. The year of publication is sufficiently earlier than the effective US Filing date, so the particular month of publication is not an issue.
Kouprine et al., Polymer-like C:H Thin Film Coating of Nanopowders in Capacitively Coupled RF Discharge, Plasma Chemistry, Plasma Processing, vol. 24, No. 2, Jun. 2004, 189-216.
Li et al., Effect of Grain Size Reduction on High Temperature Oxidation of Binary Two-Phase Alloys, Trans Nonferrous Met Soc China, vol. 11, No. 5, Oct. 2001, 8 pages.
Lu et al., Oxidation of Polycrystalline Titanium Surface by Oxygen and Water, Surface Science, vol. 458, 2000, 80-90. The year of publication is sufficiently earlier than the effective US Filing date, so the particular month of publication is not an issue.
Mc Cracken et al., Production of Fine Titanium Powders via the Hybride-Dehydride (HDH) Process, Powder Injection Moulding International, vol. 2, No. 2, Jun. 2008.
Mc Cracken et al., Production of a New Plasma Spheroidised (PS) Titanium Powder, Powder Injection Molding International, vol. 6, No. 3, 2012, 78-80. The year of publication is sufficiently earlier than the effective US Filing date, so the particular month of publication is not an issue.
NASA Tech Brief, Advances in Induction-Heated Plasma Torch Technology, B72-10151, Lewis Research Center, May 1972, 2 pages.
Notomi et al., Correlation Between Particle Velocity and Diameter in Plasma Spraying of Ni—Cr Alloy, Proceeding of the International Therma Spray Conference & Exposition, Florida, 1992, 349-353.
PM Special Feature, Plasma Atomization Gives Unique Spherical Powders, MPR, 1997.
Raymor AP&C: Leading the Way with Plasma Atomised Ti Spherical Powders for MIM, Powder Injection Moulding International, vol. 5, No. 4, 2011, 55-57.
Reactive Plasma Spray Forming of Al—TiAl3 Composites Using a Triple Plasma System, Doctor of Philosophy thesis by Majid Entezarian at the Faculty of Graduate Studies and Research of McGill University, Montreal, Canada, published in Jun. 2017.
Rieken, Gas Atomized Precursor Alloy Powder for Oxide Dispersion Strengthened Ferritic Stainless Steel, Iowa State University Graduate Theses and Dissertation, 2011, 363 pages. The year of publication is sufficiently earlier than the effective US Filing date, so the particular month of publication is not an issue.

(56) References Cited

OTHER PUBLICATIONS

Samal et al., Sampling and Classification of Powders, ASM Handbook, vol. 7—Powder Metallurgy, ASM International, 2015, 17 pages.

Simonelli et al., Microstructure and Mechanical Properties of Ti—6Al—4V Fabricated by Selective Laser Melting, TMS 2012 Supplemental Proceedings, vol. 1, pp. 863-870. (Abstract Only).

Smagorinski et al., Production of Spherical Titanium Powder by Plasma Atomization, Advances in Powder Metallurgy & Particulate Materials, Canada, 2002, 3/248-3-260.

Soucy et al., Heat and Mass Transfer During In-Flight Nitridation of Molybdenum Disilicide Powder in an Induction Plasma Reactor, Materials Science and Engineering A300, 2001, 226-234. The year of publication is sufficiently earlier than the effective US Filing date, so the particular month of publication is not an issue.

Sumper et al., Electrical Energy Efficiency: Technologies and Applications, 2012, 315-316. The year of publication is sufficiently earlier than the effective US Filing date, so the particular month of publication is not an issue.

Tanaka et al., Active Hydroxyl Groups on Surface Oxide Film of Titanium, 316L Stainless Steel, and Cobalt-Chromium-Molybdenum Alloy and Its Effect on the Immobilization of Poly (Ethylene Glycol), Materials Transactions, vol. 49, No. 4, 2008, 805-811. The year of publication is sufficiently earlier than the effective US Filing date, so the particular month of publication is not an issue.

UHP Argon AR, Advanced Specialty Gases, 2015. Retrieved Feb. 15, 2023 from https://www.advancedspecialtygases.com/UHP%20Ar.html.

Vert, High Quality Powder Manufacturing and Recycling by Induction Plasma Technology, Presented at Euro PM2015 Congress & Exhibition, France, Oct. 2015, 41 pages.

Vert et al., Induction Plasma Technology Applied to Powder Manufacturing: Example of Titanium-Based Materials, 22$^{nd}$ International Symposium on Plasma Chemistry, Belgium, Jul. 2015, 3 pages.

Wei et al., The Manufacture of Spherical Titanium Alloy Powder in Plasma, IOP Conference Series: Materials Science and Engineering, vol. 62, 2014, 012011, 5 pages.

Https://enwikipedia.org/wiki/induction_plasma. Retrieved on Jun. 11, 2018.

\* cited by examiner

METAL POWDER ATOMIZATION MANUFACTURING PROCESSES

CROSS-REFERENCE TO RELATED APPLICATIONS

The present application claims priority to U.S. Patent Application No. 18/786,757, filed Jul. 29, 2024, U.S. patent application Ser. No. 15/772,418, filed Apr. 30, 2018, International Application PCT/CA2016/051240, filed on Oct. 27, 2016 and US 62/247,794 filed on Oct. 29, 2015, which are hereby incorporated by reference in their entirety.

FIELD OF THE DISCLOSURE

The present disclosure relates to the field of production of spheroidal powders such as reactive metal powders. More particularly, it relates to methods and apparatuses for preparing reactive metal powders by having improved flowability.

BACKGROUND OF THE DISCLOSURE

Typically, the desired features of high quality reactive metal powders will be a combination of high sphericity, density, purity, flowability and low amount of gas entrapped porosities. Fine powders are useful for applications such as 3D printing, powder injection molding, hot isostatic pressing and coatings. Such fine powders are used in aerospace, biomedical and industrial fields of applications.

A powder having poor flowability may tend to form agglomerates having lower density and higher surface area. These agglomerates can be detrimental when used in applications that require of fine reactive metal powders. Furthermore, reactive powder with poor flowability can cause pipes clogging and/or stick on the walls of an atomization chamber of an atomizing apparatus or on the walls of conveying tubes. Moreover, powders in the form of agglomerates are more difficult to sieve when separating powder into different size distributions. Manipulation of powder in the form of agglomerates also increases the safety risks as higher surface area translates into higher reactivity.

By contrast, metal powders having improved flowability are desirable for various reasons. For example, they can be used more easily in powder metallurgy processes as additive manufacturing and coatings.

SUMMARY

It would thus be highly desirable to be provided with a device, system or method that would at least partially address the poor flowability of reactive metal powder related to static electricity sensitivity. A high flowability powder usually translates in a higher apparent density and it can be spread more easily in order to produce an uniform layer of powder.

According to one aspect, there is provided a reactive metal powder atomization manufacturing process comprising:
 providing a heated metal source; and
 contacting said heated metal source with at least one additive gas while carrying out said atomization process.

According to another aspect, there is provided a reactive metal powder atomization manufacturing process comprising:
 providing a heated metal source; and
 contacting said heated metal source with at least one additive gas while carrying out said atomization process, thereby obtaining a raw reactive metal powder comprising
 particle size distribution of about 10 to about 53 µm having a flowability less than 40 s, measured according to ASTM B213;
 particle size distribution of about 10 to about 45 µm having a flowability less than 40 s, measured according to ASTM B213;
 particle size distribution of about 15 to about 45 µm having a flowability less than 40 s, measured according to ASTM B213;
 particle size distribution of about 15 to about 53 µm having a flowability less than 40 s, measured according to ASTM B213;
 particle size distribution of about 25 to about 45 µm having a flowability less than 40 s, measured according to ASTM B213;
 particle size distribution of about 25 to about 53 µm having a flowability less than 40 s, measured according to ASTM B213;
 particle size distribution of about 45 to about 75 µm having a flowability less than 28 s, measured according to ASTM B213;
 particle size distribution of about 45 to about 106 µm having a flowability less than 28 s, measured according to ASTM B213;
 particle size distribution of about 45 to about 150 µm having a flowability less than 28 s, measured according to ASTM B213; and/or
 particle size distribution of about 45 to about 180 µm having a flowability less than 28 s, measured according to ASTM B213.

According to another aspect, there is provided a reactive metal powder atomization manufacturing process comprising:
 providing a heated metal source;
 mixing together an atomization gas and at least one additive gas to obtain an atomization mixture;
 contacting said heated metal source with said atomization mixture while carrying out said atomization process.

According to another aspect, there is provided a reactive metal powder atomization manufacturing process comprising:
 providing a heated metal source;
 mixing together an atomization gas and at least one additive gas to obtain an atomization mixture;
 contacting said heated metal source with said atomization mixture while carrying out said atomization process, thereby obtaining a raw reactive metal powder comprising
 particle size distribution of about 10 to about 53 µm having a flowability less than 40 s, measured according to ASTM B213;
 particle size distribution of about 10 to about 45 µm having a flowability less than 40 s, measured according to ASTM B213;
 particle size distribution of about 15 to about 45 µm having a flowability less than 40 s, measured according to ASTM B213;

particle size distribution of about 15 to about 53 μm having a flowability less than 40 s, measured according to ASTM B213;

particle size distribution of about 25 to about 45 μm having a flowability less than 40 s, measured according to ASTM B213;

particle size distribution of about 25 to about 53 μm having a flowability less than 40 s, measured according to ASTM B213;

particle size distribution of about 45 to about 75 μm having a flowability less than 28 s, measured according to ASTM B213;

particle size distribution of about 45 to about 106 μm having a flowability less than 28 s, measured according to ASTM B213;

particle size distribution of about 45 to about 150 μm having a flowability less than 28 s, measured according to ASTM B213; and/or particle size distribution of about 45 to about 180 μm having a flowability less than 28 s, measured according to ASTM B213.

According to another aspect, there is provided a metal powder atomization manufacturing process comprising:

providing a heated metal source; and contacting said heated metal source with at least one additive gas while carrying out said atomization process under conditions sufficient to produce a reactive metal powder having an added content of each electronegative atom and/or molecule from the additive gas of less than 1000 ppm.

According to another aspect, there is provided a metal powder atomization manufacturing process comprising:

providing a heated metal source;

mixing together an atomization gas and at least one additive gas to obtain an atomization mixture; and contacting said heated metal source with said atomization mixture while carrying out said atomization process under conditions sufficient to produce a raw reactive metal powder having an added content of electronegative atoms and/or molecules from the additive gas of less than 1000 ppm.

According to another aspect, there is provided a metal powder atomization manufacturing process comprising:

providing a heated metal source;

mixing together an atomization gas and at least one additive gas to obtain an atomization mixture;

contacting said heated metal source with said atomization mixture while carrying out said atomization process, thereby obtaining a raw metal powder;

sieving said raw reactive metal powder to obtain a powder having predetermined particle size; and contacting said powder having said predetermined particle size with water.

According to another aspect, there is provided a reactive metal powder spheroidization manufacturing process comprising:

providing a reactive metal powder source; and contacting said reactive metal powder source with at least one additive gas while carrying out said spheroidization process.

According to another aspect, there is provided a reactive metal powder spheroidization manufacturing process comprising:

providing a reactive metal powder source; and contacting said reactive metal powder source with at least one additive gas while carrying out said spheroidization process, thereby obtaining a raw reactive metal powder comprising particle size distribution of about 10 to about 53 μm having a flowability less than 40 s, measured according to ASTM B213;

particle size distribution of about 10 to about 45 μm having a flowability less than 40 s, measured according to ASTM B213;

particle size distribution of about 15 to about 45 μm having a flowability less than 40 s, measured according to ASTM B213;

particle size distribution of about 15 to about 53 μm having a flowability less than 40 s, measured according to ASTM B213;

particle size distribution of about 25 to about 45 μm having a flowability less than 40 s, measured according to ASTM B213;

particle size distribution of about 25 to about 53 μm having a flowability less than 40 s, measured according to ASTM B213;

particle size distribution of about 45 to about 75 μm having a flowability less than 28 s, measured according to ASTM B213;

particle size distribution of about 45 to about 106 μm having a flowability less than 28 s, measured according to ASTM B213;

particle size distribution of about 45 to about 150 μm having a flowability less than 28 s, measured according to ASTM B213; and/or particle size distribution of about 45 to about 180 μm having a flowability less than 28 s, measured according to ASTM B213.

According to another aspect, there is provided a reactive metal powder spheroidization manufacturing process comprising:

providing a reactive metal powder source;

mixing together a spheroidization process gas and at least one additive gas to obtain a spheroidization process gas mixture;

contacting said reactive metal powder source with said spheroidization process gas mixture while carrying out said spheroidization process, According to another aspect, there is provided a reactive metal powder spheroidization manufacturing process comprising:

providing a reactive metal powder source;

mixing together a spheroidization process gas and at least one additive gas to obtain a spheroidization process gas mixture;

contacting said reactive metal powder source with said spheroidization process gas mixture while carrying out said spheroidization process, thereby obtaining a raw reactive metal powder comprising particle size distribution of about 10 to about 53 μm having a flowability less than 40 s, measured according to ASTM B213;

particle size distribution of about 10 to about 45 μm having a flowability less than 40 s, measured according to ASTM B213;

particle size distribution of about 15 to about 45 µm having a flowability less than 40 s, measured according to ASTM B213;
particle size distribution of about 15 to about 53 µm having a flowability less than 40 s, measured according to ASTM B213;
particle size distribution of about 25 to about 45 µm having a flowability less than 40 s, measured according to ASTM B213;
particle size distribution of about 25 to about 53 µm having a flowability less than 40 s, measured according to ASTM B213;
particle size distribution of about 45 to about 75 µm having a flowability less than 28 s, measured according to ASTM B213;
particle size distribution of about 45 to about 106 µm having a flowability less than 28 s, measured according to ASTM B213;
particle size distribution of about 45 to about 150 µm having a flowability less than 28 s, measured according to ASTM B213; and/or
particle size distribution of about 45 to about 180 µm having a flowability less than 28 s, measured according to ASTM B213.

According to another aspect, there is provided a reactive metal powder spheroidization manufacturing process comprising:
  providing a reactive metal powder source; and
  contacting said reactive metal source with at least one additive gas while carrying out said spheroidization process under conditions sufficient to produce a raw reactive metal powder having an added content of each electronegative atom and/or molecule from the additive gas of less than 1000 ppm.

According to another aspect, there is provided a reactive metal powder spheroidization manufacturing process comprising:
  providing a reactive metal powder source;
  mixing together a spheroidization process gas and at least one additive gas to obtain a spheroidization process gas mixture;
  contacting said reactive metal powder source with said spheroidization process gas mixture while carrying out said spheroidization process under conditions sufficient to produce a raw reactive metal powder having an added content of electronegative atoms and/or molecules from the additive gas of less than 1000 ppm.

According to another aspect, there is provided a metal powder spheroidization manufacturing process comprising:
  providing a reactive metal powder source;
  mixing together spheroidization process gas and at least one additive gas to obtain a spheroidization process gas mixture;
  contacting said reactive metal powder source with said spheroidization process gas mixture while carrying out said atomization process, thereby obtaining a raw metal powder;
  sieving said raw reactive metal powder to obtain a powder having predetermined particle size;
  contacting said powder having said predetermined particle size with water.

According to another example, there is provided a process for preparing a reactive metal powder mixture comprising mixing together a reactive metal powder obtained by a process as defined in the present disclosure, with a reactive metal powder obtained by a process different than those recited in the present disclosure.

According to another example, there is provided a process for preparing a reactive metal powder mixture comprising mixing together a reactive metal powder obtained by a process as defined in the present disclosure, with a reactive metal powder obtained by a process different than those recited in the present disclosure.

According to another example, there is provided a process for preparing a reactive metal powder mixture comprising mixing together a reactive metal powder obtained by a metal powder atomization manufacturing process as defined in the present disclosure, with a reactive metal powder obtained by a metal powder spheroidization manufacturing process as defined in the present disclosure.

According to another example, there is provided a reactive metal powder obtained by a process as defined in the present disclosure.

The present disclosure refers to methods, processes, systems and apparatuses that enable the production of reactive metal powder that exhibits a high flowability. The effect can be observed for various particle size distributions including for fine particle size distributions which would not even flow in a Hall flowmeter without the treatment described. One advantage of current method is that it does not add foreign particles in the powder. It is only a surface treatment that causes the improvement.

It was observed that the various technologies described in the present disclosure help to reduce the static electricity sensitivity of the powder which is resulting in improved flowability behavior of the powder.

DRAWINGS

The following drawings represent non-limitative examples in which.

DESCRIPTION OF VARIOUS EMBODIMENTS

Figure 1:
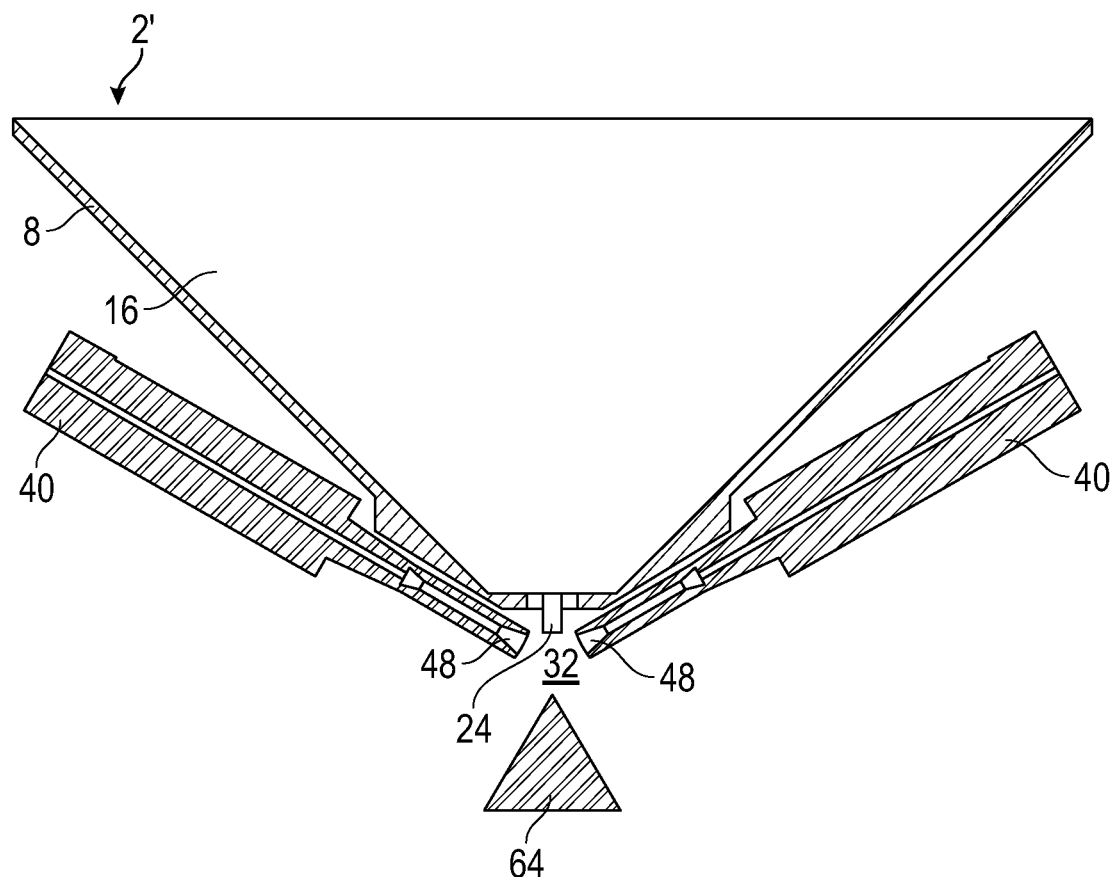
FIG. 1 is a cross-sectional view of an example atomizing system.

The following examples are presented in a non-limiting manner.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "atomization zone" as used herein, when referring to a method, apparatus or system for preparing a metal powder, refers to a zone in which the material is atomized into droplets of the material. The person skilled in the art would understand that the dimensions of the atomization zone will vary according to various parameters such as temperature of the atomizing means, velocity of the atomizing means, material in the atomizing means, power of the atomizing means, temperature of the material before entering in the atomization zone, nature of the material, dimensions of the material, electrical resistivity of the material, etc.

The expression "heat zone of an atomizer" as used herein refers to a zone where the powder is sufficiently hot to react with the electronegative atoms of the additive gas in order to generate a depletion layer, as discussed in the present disclosure.

The expression "metal powder has a X-Y µm particle size distribution means it has less than 5% wt. of particle above Y µm size with the latter value measured according to ASTM B214 standard. It also means it has less than 6% wt. of particle below X µm size (d6≥X µm) with the latter value measured according to ASTM B822 standard.

The expression "metal powder having a 15-45 µm particle size means it has less than 5% wt. of particle above 45 µm (measured according to ASTM B214 standard) and less than 6% wt. of particle below 15 µm (measured according to ASTM B822 standard).

The expression "Gas to Metal ratio" as used herein refers to the ratio of mass per unit of time (kg/s) of gas injected on the mass feedrate (kg/s) of the metal source provided in the atomization zone.

The expression "reactive metal powder" as used herein refers to a metal powder that cannot be efficiently prepared via the classical gas atomization process in which close-coupled nozzle is used. For example, such a reactive metal powder can be a powder comprising at least one member chosen from titanium, titanium alloys, zirconium, zirconium alloys, magnesium, magnesium alloys, aluminum and aluminum alloys.

The term "raw reactive metal powder" as used herein refers to a reactive metal powder obtained directly from an atomization process without any post processing steps such as sieving or classification techniques.

It was observed that reactive metal powder having fine particle sizes, such within a size distributions below 106 µm, possess more surface area and stronger surface interactions. These result in poorer flowability behavior than coarser powders. The flowability of a powder depends on one or more of various factors, such as particle shape, particle size distribution, surface smoothness, moisture level, satellite content and presence of static electricity. The flowability of a powder is thus a complex macroscopic characteristic resulting from the balance between adhesion and gravity forces on powder particles.

For example, particle size distribution can be:
of about 10 to about 53 µm having a flowability less than 40 s, measured according to ASTM B213;
of about 10 to about 45 µm having a flowability less than 40 s, measured according to ASTM B213;
of about 15 to about 45 µm having a flowability less than 40 s, measured according to ASTM B213;
of about 15 to about 53 µm having a flowability less than 40 s, measured according to ASTM B213;
of about 25 to about 45 µm having a flowability less than 40 s, measured according to ASTM B213;
of about 25 to about 53 µm having a flowability less than 40 s, measured according to ASTM B213;
of about 45 to about 75 µm having a flowability less than 28 s, measured according to ASTM B213;
of about 45 to about 106 µm having a flowability less than 28 s, measured according to ASTM B213;
of about 45 to about 150 µm having a flowability less than 28 s, measured according to ASTM B213; and/or
of about 45 to about 180 µm having a flowability less than 28 s, measured according to ASTM B213.

For example, particle size distribution can be of about 10 to about 53 µm having a flowability less than 36 s, measured according to ASTM B213.

For example, particle size distribution can be of about 10 to about 53 µm having a flowability less than 32 s, measured according to ASTM B213.

For example, particle size distribution can be of about 10 to about 53 µm having a flowability less than 30 s, measured according to ASTM B213.

For example, particle size distribution can be of about 10 to about 53 µm having a flowability less than 28 s, measured according to ASTM B213.

For example, particle size distribution can be of about 10 to about 45 µm having a flowability less than 36 s, measured according to ASTM B213.

For example, particle size distribution can be of about 10 to about 45 µm having a flowability less than 32 s, measured according to ASTM B213.

For example, particle size distribution can be of about 10 to about 45 µm having a flowability less than 30 s, measured according to ASTM B213.

For example, particle size distribution can be of about 10 to about 45 µm having a flowability less than 28 s, measured according to ASTM B213.

For example, particle size distribution can be of about 15 to about 45 µm having a flowability less than 36 s, measured according to ASTM B213.

For example, particle size distribution can be of about 15 to about 45 µm having a flowability less than 32 s, measured according to ASTM B213.

For example, particle size distribution can be of about 15 to about 45 µm having a flowability less than 30 s, measured according to ASTM B213.

For example, particle size distribution can be of about 15 to about 45 µm having a flowability less than 28 s, measured according to ASTM B213.

For example, particle size distribution can be of about 15 to about 53 µm having a flowability less than 36 s, measured according to ASTM B213.

For example, particle size distribution can be of about 15 to about 53 µm having a flowability less than 32 s, measured according to ASTM B213.

For example, particle size distribution can be of about 15 to about 53 µm having a flowability less than 30 s, measured according to ASTM B213.

For example, particle size distribution can be of about 15 to about 53 µm having a flowability less than 28 s, measured according to ASTM B213.

For example, the raw reactive metal powder comprises a particle size distribution of about 25 to about 45 µm having a flowability less than 36 s, measured according to ASTM B213.

For example, the raw reactive metal powder comprises a raw reactive metal powder comprises a particle size distribution of about 25 to about 45 µm having a flowability less than 32 s, measured according to ASTM B213.

For example, the raw reactive metal powder comprises a raw reactive metal powder comprises a particle size distribution of about 25 to about 45 µm having a flowability less than 30 s, measured according to ASTM B213.

For example, the raw reactive metal powder comprises a particle size distribution of about 25 to about 45 µm having a flowability less than 25 s, measured according to ASTM B213.

For example, the raw reactive metal powder comprises a particle size distribution of about 25 to about 53 µm having a flowability less than 36 s, measured according to ASTM B213.

For example, the raw reactive metal powder comprises a particle size distribution of about 25 to about 53 µm having a flowability less than 32 s, measured according to ASTM B213.

For example, the raw reactive metal powder comprises a particle size distribution of about 25 to about 53 µm having a flowability less than 30 s, measured according to ASTM B213.

For example, the raw reactive metal powder comprises a particle size distribution of about 25 to about 53 µm having a flowability less than 25 s, measured according to ASTM B213.

For example, the raw reactive metal powder comprises a particle size distribution of about 45 to about 75 µm having a flowability less than 26 s, measured according to ASTM B213.

For example, the raw reactive metal powder comprises a particle size distribution of about 45 to about 75 µm having a flowability less than 25 s, measured according to ASTM B213.

For example, the raw reactive metal powder comprises a particle size distribution of about 45 to about 75 µm having a flowability less than 24 s, measured according to ASTM B213.

For example, the raw reactive metal powder comprises a particle size distribution of about 45 to about 75 µm having a flowability less than 23 s, measured according to ASTM B213.

For example, the raw reactive metal powder comprises a particle size distribution of about 45 to about 106 µm having a flowability less than 26 s, measured according to ASTM B213.

For example, the raw reactive metal powder comprises a particle size distribution of about 45 to about 106 µm having a flowability less than 25 s, measured according to ASTM B213.

For example, the raw reactive metal powder comprises a particle size distribution of about 45 to about 106 µm having a flowability less than 24 s, measured according to ASTM B213.

For example, the raw reactive metal powder comprises a particle size distribution of about 45 to about 106 µm having a flowability less than 23 s, measured according to ASTM B213.

For example, the raw reactive metal powder comprises a particle size distribution of about 45 to about 150 µm having a flowability less than 26 s, measured according to ASTM B213.

For example, the raw reactive metal powder comprises a particle size distribution of about 45 to about 150 µm having a flowability less than 25 s, measured according to ASTM B213.

For example, the raw reactive metal powder comprises a particle size distribution of about 45 to about 150 µm having a flowability less than 24 s, measured according to ASTM B213.

For example, the raw reactive metal powder comprises a particle size distribution of about 45 to about 150 µm having a flowability less than 23 s, measured according to ASTM B213.

For example, the raw reactive metal powder comprises a particle size distribution of about 45 to about 180 µm having a flowability less than 26 s, measured according to ASTM B213.

For example, the raw reactive metal powder comprises a particle size distribution of about 45 to about 180 µm having a flowability less than 25 s, measured according to ASTM B213.

For example, the raw reactive metal powder comprises a particle size distribution of about 45 to about 180 µm having a flowability less than 24 s, measured according to ASTM B213.

For example, the raw reactive metal powder comprises a particle size distribution of about 45 to about 180 µm having a flowability less than 23 s, measured according to ASTM B213.

For example, the heated metal source is contacted with said at least one additive gas in an atomizing zone of an atomizer.

For example, the heated metal source is contacted with said at least one additive gas within a heat zone of an atomizer.

For example, the heated metal source is contacted with said at least one additive gas at substantially the same time as contact with an atomizing gas.

For example, the atomizing gas is an inert gas.

For example, the atomizing gas and the additive gas are mixed together prior to contact with the heated metal source.

For example, the contacting with the additive gas causes formation of a first layer and a second layer on the surface of the raw metal particles, said first layer comprising atoms of said heated metal with atoms and/or molecules of said additive gas, said first layer being a depletion layer deeper and thicker than a native oxide layer, said second layer being a native oxide layer.

For example, the first layer has a substantially positive charge and the second layer has a substantially negative charge, and wherein the first layer and the second layer have a combined charge that is substantially neutral.

For example, the process further comprises:
sieving the raw reactive metal powder after atomizing of the heated metal source to separate the raw reactive metal powder by particle size distributions.

For example, the process further comprises:
after sieving, separately stirring the separated raw material powder in water.

For example, the water is distilled water or demineralized water.

For example, the flowability of the reactive metal powder is measured on the dried sieved metal powder after having been stirred.

For example, the reactive metal powder has an added content of each electronegative atom and/or molecule from the additive gas of less than 1000 ppm.

For example, the reactive metal powder has an added content of each of said electronegative atom and/or molecule from the additive gas of less than 500 ppm.

For example, the reactive metal powder has an added content of each of said electronegative atom and/or molecule from the additive gas of less than 250 ppm.

For example, the reactive metal powder has an added content of each of said electronegative atom and/or molecule from the additive gas of less than 200 ppm.

For example, the reactive metal powder has an added content of each of said electronegative atom and/or molecule from the additive gas of less than 150 ppm.

For example, the reactive metal powder has an added content of each of said electronegative atom and/or molecule from the additive gas of less than 100 ppm.

For example, the predetermined particle size is comprising any particle size distributions of about 10-53 µm such as 10-45 µm, 15-45 µm, 10-53 µm, 15-53 µm, and/or 25-45 µm.

For example, the at least one additive gas is an oxygen-containing gas.

For example, the at least one additive gas is an oxygen-containing gas chosen from $O_2$, $CO_2$, CO, $NO_2$, air, water vapor and mixtures thereof.

For example, the at least one additive gas is a halogen-containing gas.

For example, the halogen is F, Cl, Br or I.

For example, the at least one additive gas is a hydrogen-containing gas.

For example, the at least one additive gas is a sulfur-containing gas.

For example, the at least one additive gas is a nitrogen-containing gas.

For example, the at least one additive gas is chosen from $O_2$, $H_2O$, CO, $CO_2$, $NO_2$, $N_2$, $NO_3$, $Cl_2$, $SO_2$, $SO_3$, and mixtures thereof.

For example, the reactive metal powder comprises at least one of titanium, zirconium, magnesium, and aluminum.

For example, the reactive metal powder is a metal powder comprising at least one member chosen from one of titanium, titanium alloys, zirconium, zirconium alloys, magnesium, magnesium alloys, aluminum and aluminum alloys.

For example, the reactive metal powder comprises titanium.

For example, the reactive metal powder comprises a titanium alloy.

For example, the reactive metal powder comprises zirconium.

For example, the reactive metal powder comprises a zirconium alloy.

For example, the reactive metal powder is a metal powder comprising at least one member chosen from one of titanium and titanium alloys.

For example, the process is carried out by means of at least one plasma torch.

For example, the process is carried out by means of at least one plasma torch.

For example, the at least one plasma torch is a radio frequency (RF) plasma torch.

For example, the least one plasma torch is a direct current (DC) plasma torch.

For example, the least one plasma torch is a microwave (MW) plasma torch.

Referring now to FIG. 1, therein illustrated is a cross-section of an example of atomizing system 2'. The atomizing system 2' includes a receptacle 8 that receives feed of a metal source 16 from an upstream system. For example, the feed of metal source 16 is provided as a melted stream, but it may be provided as a metal rod or wire as well. The metal source may be heated according to various techniques.

The heated metal source 16 is fed, through an outlet 24, into an atomization zone 32, which is immediately contacted with an atomizing fluid from an atomizing source 40. Contact of the heated metal source 16 by the atomizing fluid causes raw reactive metal powder 64 to be formed, which is then exited from the atomization zone 32. For example, the atomizing fluid may be an atomizing gas. For example, the atomizing gas may be an inert gas.

For example, the inert gas can be chosen from Ar and/or He.

It will be understood that while an atomizing system 2'having atomizing plasma torches 40, methods and apparatus described herein for forming reactive metal powder having improved flowability may be applied to other types of spherical powder production system, such as skull melting gas atomization process, electrode induction melting gas atomization process (EIGA process), plasma rotating electrode process, plasma (RF, DC, MW) spheroidization process, etc.

According to the illustrated example, the plasma source 40 includes at least one plasma torch. At least one discrete nozzle 48 of the at least one plasma torch 40 is centered upon the metal source feed. For example, the cross-section of the nozzle 48 may be tapered towards the metal source feed so as to focus the plasma that contacts the metal source feed. As described elsewhere herein, the nozzle 48 may be positioned so that the apex of the plasma jet contacts the metal source fed from the receptacle 8. The contacting of the metal source feed by the plasma from the at least one plasma source 40 causes the metal source to be atomized.

Where a plurality of plasma torches are provided, the nozzles of the torches are discrete nozzles 48 of the plasma torches that are oriented towards the metal source from the receptacle 8. For example, the discrete nozzles 48 are positioned so that the apexes of the plasma jet outputted therefrom contacts the metal source from the receptacle 8.

According to various exemplary embodiments for preparing spheroidal powders, the heated metal source is contact with at least one additive gas while carrying out the atomization process.

The additive gas can be any gas comprising electronegative atom or molecule. The additive gas may include fluorine, chlorine, iodine, bromide, hydrogen-based, nitrogen-based and carbon-based compounds.

The additive gas may be an oxygen-containing gas. The expression "oxygen-containing gas" as used herein refers to a gas that contains at least one atom of oxygen. For example, such a gas may be $O_2$, $CO_2$, CO, $NO_2$, air, water vapor, ozone, etc.

According to various exemplary embodiments, the additive gas contacts the heated metal source 16 within the atomization zone 32 of an atomizer. This atomization zone 32 is a high heat zone of the atomizer. Accordingly, the heated metal source 16 may be contacted by the atomization gas and the additive gas at substantially the same time within the atomization zone 32.

The reaction between the metal particles produced from the atomization of the heated metal source and the additive gas can take place as long as the metal particles are sufficiently hot to allow the electronegative atoms and/or molecules to diffuse several tens of nanometers into the surface layer.

It will be understood that according to various exemplary embodiments described herein, the additive gas contacts the heated metal source during the atomization process in addition to the contacting of the heated metal source with the atomizing fluid.

It will be further understood that according to existing atomization processes, some additive gas may be inherently introduced into the atomizing fluid, such as through contamination, latent impurities, or leaks. For example, the introduced additive gas may include air or oxygen.

However, according to various exemplary embodiments described herein for producing spheroidal powders, the additive gas for contacting the heated metal source is deliberately provided in addition to any additive gas that could be inherently introduced during the atomization process.

According to various exemplary embodiments, a first set of nozzles projects the atomizing fluid into the atomization zone 32 to contact the heated metal source 16 and a second set of nozzles injects the additive gas into the atomization zone 32 to contact the heated metal source 16. Another alternative is that the second set of nozzles can mix the additive gas in a compatible fluid with the atomizing fluid prior to inject into the atomization zone 32. For example, the atomizing fluid and the additive gas contact the heated metal source 16 at substantially the same time or slightly after. For example, it is possible to mix the additive gas to dilute such additive gas and avoid too large local concentration that could result in an adverse or undesired reaction.

According to various alternative exemplary embodiments, the atomizing fluid is an atomizing gas, which is mixed with the at least one additive gas to form an atomization mixture. For example, the atomizing gas and the additive gas are mixed together prior to contact with the heated metal source. The atomizing gas and the additive gas may be mixed together within a gas storage tank or a pipe upstream of the contacting with the heated metal source. For example, the additive gas may be injected into a tank of atomizing gas. The injected additive gas is in addition to any additive gas inherently present into the atomizing gas.

The amount of additive gas contacting the heated metal source may be controlled based on desired end properties of the reactive metal powders to be formed from the atomization process.

For example, the additive gas contained within the formed reactive metal powder may be viewed as a contaminant of the metal powder. Accordingly, the amount of additive gas contacting the heated metal source is controlled so that the amount of atoms and/or molecules of the additive gas contained within the reactive metal powder is maintained within certain limits.

For example, the chemical composition limit within reactive metal powder may be prescribed by appropriate standards, such as the composition in table 1 of AMS 4998, ASTM F3001, ASTM F2924, ASTM B348, ASTM B350 and in table 3 of ASTM B550. Accordingly, the amount of additive gas contacting the heated metal source is controlled based on the composition of the additive gas and the limit or limits prescribed by standard for the one or more atoms and/or molecules composing the additive gas.

For example, where the additive gas contains oxygen and the reactive metal powder to be formed is titanium alloy powder, the amount of additive gas contacting the heated metal source is controlled so that the amount of oxygen within the formed reactive metal powder is below 1800 ppm according to the AMS 4998 standard and is below 1300 ppm according to ASTM F3001.

For example, where the additive gas contains carbon and the reactive metal powder to be formed is titanium alloy powder, the amount of additive gas contacting the heated metal source is controlled so that the amount of carbon within the formed reactive metal powder is below 1000 ppm according to the AMS 4998 standard and is below 800 ppm according to ASTM F3001.

For example, where the additive gas contains hydrogen and the reactive metal powder to be formed is titanium alloy powder, the amount of additive gas contacting the heated metal source is controlled so that the amount of hydrogen within the formed reactive metal powder is below 120 ppm according to the AMS 4998 standard and ASTM F3001.

For example, where the additive gas contains nitrogen and the reactive metal powder to be formed is titanium alloy powder, the amount of additive gas contacting the heated metal source is controlled so that the amount of nitrogen within the formed reactive metal powder is below about 400 ppm according to the AMS 4998 standard and is below 500 ppm according to ASTM F3001.

For example, where the additive gas contains chlorine and the reactive metal powder to be formed is titanium metal powder, the amount of additive gas contacting the heated metal source is controlled so that the amount of chlorine within the formed reactive metal powder is below about 1000 ppm according to the ASTM F3001 standard.

For example, the amount of additive gas contacting the heated metal source may be controlled by controlling the quantity of additive gas injected into the atomization gas when forming the atomization mixture. For example, the amount of additive gas injected may be controlled to achieve one or more desired ranges of ratios of atomization gas to additive gas within the formed atomization mixture.

For reactive metal powders formed without the addition of an additive gas, it was observed that reactive metal powders having various different particle size distributions and that had undergone sieving and blending steps did not always flow sufficiently to allow measurement of their flowability in a Hall flowmeter (see FIG. 1 of ASTM B213). For example, reactive metal powder falling within particle size distributions between 10-53 μm did not flow in a Hall flowmeter according to ASTM B213.

Without being bound by the theory, one important factor for causing the poor flowability of reactive metal powder is its sensitivity to static electricity. The sieving, blending and manipulation steps may cause particles of the reactive metal powder to collide with one another, thereby increasing the level of static electricity. This static electricity further creates cohesion forces between particles, which causes the reactive metal powder to flow poorly.

The raw reactive metal powder formed from atomizing the heated metal source by contacting the heated metal source with the atomization gas and the additive gas is further collected. The collected raw reactive metal powder contains a mixture of metal particles of various sizes. The raw reactive metal powder is further sieved so as to separate the raw reactive metal powder into different size distributions, such as 10-45 μm, 15-45 μm, 10-53 μm, 15-53 μm, and/or 25-45 μm.

After sieving, each particle size distribution of metal powder is separately stirred in distilled water or demineralized water. The stirring may help to remove electrostatic charges accumulated on the surface of the particles of the metal powder.

After sieving, each particle size distributions of metal powder is separately left to dry.

It was observed that reactive metal powders formed according to various exemplary atomization methods described herein in which the heated metal source is contacted with the additive gas exhibited substantially higher flowability than reactive metal powders formed from an atomization methods without the contact of the additive gas. This difference in flowability between metal powders formed according to the different methods can mostly be sized in metal powders having the size distributions of 10-45 µm, 15-45 µm, 10-53 µm, 15-53 µm and/or 25-45 µm or similar particle size distributions. However, it will be understood that metal powders in other size distributions may also exhibit slight increase in flowability when formed according to methods that include contact of the heated metal source with the additive gas.

It is well known that titanium forms a native surface oxide layer once exposed to air. This layer is typically about 3-5 nm and is composed essentially of titanium oxides (S. Axelsson, 2012, p. 37). The native oxide acts as a passivation layer and reduces the reactivity. This native layer has a strong affinity with water vapour (hydrophilic) and possesses hydroxyl group at the surface (Tanaka et al., 2008, p. 1; Lu et al., 2000, p. 1).

Without being bound by the theory, from contact of the heated metal source with the additive gas during atomization, atoms and/or molecules of the additive gas react with particles of the reactive metal powder as these particles are being formed. Accordingly, a first layer formed of a compound of the heated metal with the additive gas and that is depleting through the thickness is formed on the outer surface of the particles of the reactive metal particle. This layer is thicker and deeper in the surface and is located below the native oxide layer. For example, the compound of the heated metal with the additive gas in the depleted layer is metal oxide, nitride, carbide or halide. Since the atoms of the additive gas are depleting through the thickness of the surface layer, it forms a non stoichiometric compound with the metal. Such compound causes this first layer to have a substantially positive charge.

This first layer can only be formed at high temperature since the electronegative atoms and/or molecules need to have enough energy to diffuse much more into the surface layer than in a native oxide layer.

A second layer being a native oxide layer is further formed on the surface of the particles of the reactive metal powder. The hydroxyl group formed at the surface causes the second layer to have a substantially negative charge.

The first layer having a substantially positive charge and the second layer having a substantially negative charge form together an electric double layer. The combined charge of the double layer has a substantially neutral charge (i.e. net charge tending to zero). This neutral charge on the surface of the particles of the reactive metal powder may contribute to the improved flowability of the reactive metal powder formed according to exemplary methods and apparatuses described herein. For example, whereas a net charge on a particle, such as one formed according to traditional atomization methods, will favor polarization of the particle and increase the interaction with other particles, a weakly charged particle will have little electric interaction with other particles. This decreased interaction may lead to superior flowability.

Figure 2:
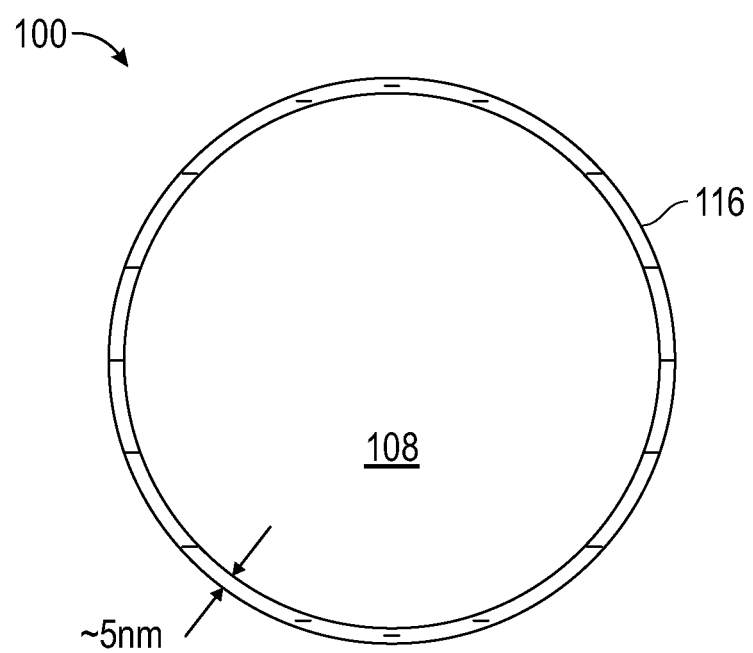
FIG. 2 is a schematic diagram of a particle of reactive metal powder formed according to an atomization process in which the heated metal source is not contacted with an additive gas.

FIG. 2 illustrates a schematic diagram of a particle 100 of reactive metal powder formed according to an atomization processes in which the heated metal source 16 is not contacted with the additive gas. The formed particle 100 generally includes a particle body 108 (for example a Ti—6Al—4V particle) and a surface native oxide layer 116. The surface native oxide layer 116 has a generally negative charge, which gives the formed particle 100 a net non-zero charge (i.e for particle 108, $Q_{net} \neq 0$). Such negative charge gives a greater ability to polarize. The particle 108 also comprises hydroxyl groups at the surface 116.

Figure 3:
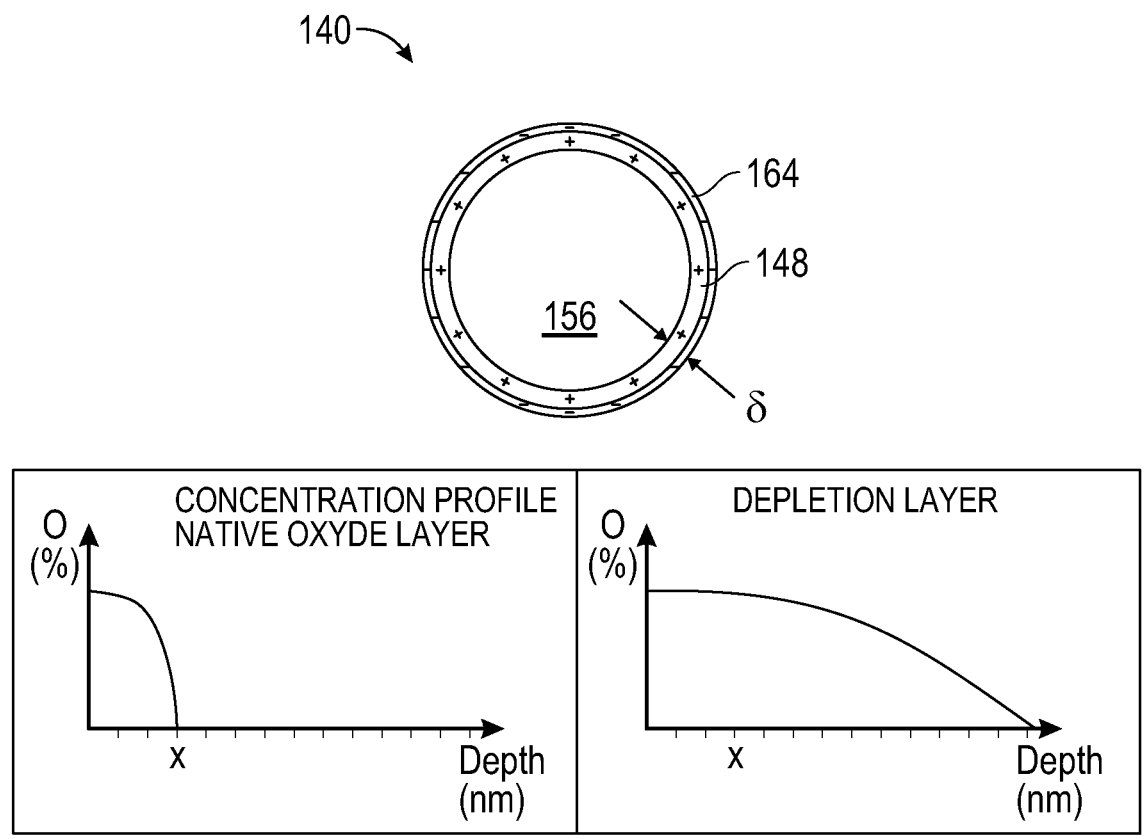
FIG. 3 is a schematic diagram of a particle of reactive metal powder formed according to an atomization process in which the heated metal source is contacted with an additive gas

FIG. 3 illustrates a schematic diagram of a particle 140 of reactive metal powder formed according to exemplary atomization methods described herein in which the heated metal source 16 is contacted with an additive gas. A first layer 148 (or layer 1) is formed on the outer surface of the particle body 156 (for example a Ti—6Al—4V particle). It results from the compounding of the heated metal with the electronegative atoms and/or molecules that are depleting through the thickness. A second layer 164 (or layer 2) being a native oxide layer is further formed on the surface of the particle body 156. As described elsewhere herein, the first layer 148 and the second layer 164 have a combined charge that is substantially neutral, thereby causing the formed particle 140 to have a substantially net zero charge ($Q_{net} \approx 0$) and a lower ability to polarize.

Following the theory that the electronegative atoms and/or molecules from the additive gas become a surface additive on the particles of the raw metal powder formed, the amount of additive gas injected with the atomization gas to form an atomization mixture may be controlled as it varies quasi linearly with the production rate of metal powder having a predetermined particle size distribution. The amount of additive gas needed to form the layer 1 is related to the total surface area of the metal particles which depends of the production rate and particle size distributions (see FIG. 4). The concentration of the additive gas and the thermal conditions of the metal particles will determine the depleting layer depth of the layer 1.

Figure 4:
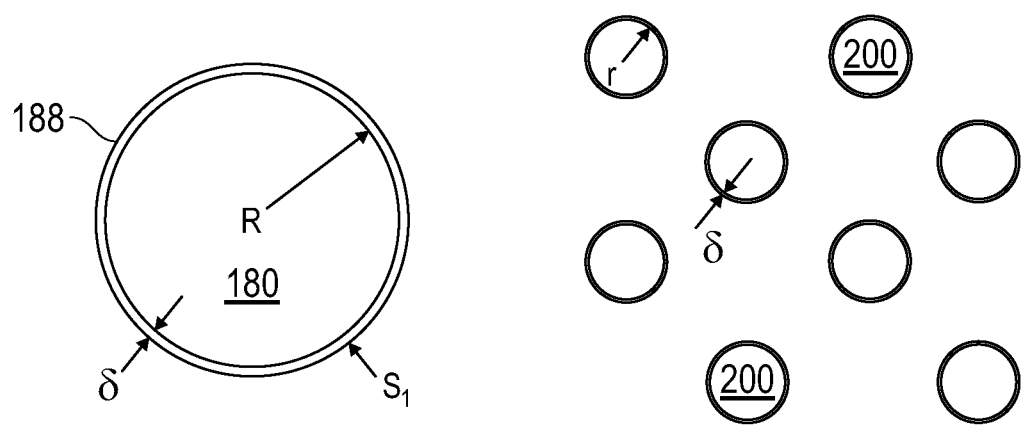
FIG. 4 illustrates a schematic diagram of a particle having a radius R and a plurality of particles each having a radius r formed from the same mass of material.

Further following the theory that the electronegative atoms and/or molecules from the additive gas become a surface additive on particles of the raw metal powder formed, the amount of additive gas injected with the atomization gas to form an atomization mixture may be controlled as it varies with the total area of the particles of the metal powder formed as shown in FIG. 4.

Further following the theory that the electronegative atoms and/or molecules from the additive gas become a surface additive on particles of the raw metal powder formed, the amount of additive gas injected with the atomization gas to form an atomization mixture may be controlled as it varies with the temperature of the surface of the particles of the raw metal powder formed. The reaction rate Φ of such chemical reaction of activation energy E generally follows an Arhenius relation with the temperature T:

$$\Phi \propto e^{-\frac{E}{kT}}$$

The injection of the additive gas at high temperature is thus more efficient and requires less additive gas concentration to generate the ideal depletion depth and form the layer 1.

FIG. 4 illustrates a schematic diagram of a particle 180 having a radius R and a depletion depth of δ at the surface of the particle 188. The total surface area of the particle is $S_1 = 4\pi R^2$.

FIG. 4 further illustrates a schematic diagram of a plurality of particles (n particles) 200 of the same size having the same total mass as the mass of the particle 180. The particles 200 are smaller in size than particle 180 but they have a larger surface area in total than particle 180. each particle 200 having a radius r and the total number of particles being $n=R^3/r^3$. The combined surface area of the particles 200 is $$S_2 = n4\pi r^2 = \frac{R}{r}S_1.$$

It increases linearly with decreasing radius of particles.

The amount of surface additive added is thus a function of the total surface area as the volume that will be treated is the product of the total surface area by the depletion depth.

For example, the obtained metal powders can have less than about 100 150, 200, 300, 500, 1000 or 1500 ppm of an electronegative atom and/or molecule (for example an electronegative atom and/or molecule element that is comprised within the additive gas used to produce the powder).

EXPERIMENT 1

Four different lots of powder were produced by plasma atomization under the same experimental conditions except for the composition of the atomization mixture contacting the heated metal source.

The atomizing gas is high purity argon (>99.997%).

In Tests 1 and 2, only the atomizing gas was used to contact the heated metal source during the atomization process.

In Test 3, air was injected to the high purity argon to form an atomization mixture of 80 ppm of air with argon. Heated metal was contacted with the atomization mixture during the atomization process.

In Test 4, $O_2$ was injected to the high purity argon to form an atomization mixture of 50 ppm of $O_2$ with argon. Heated metal was contacted with this second atomization mixture during the atomization process.

After contacting with the atomizing gas (Test 1 and 2) or the atomization mixture (Test 3 and 4), formed raw reactive metal powder is sieved to isolate the 15-45 µm particle size distributions.

The sieved powder is then mixed to ensure homogeneity.

The powder was further stirred in distilled water or demineralized water to remove static electricity charges accumulated during previous steps.

The powder was dried in air at 80° C. for 12 h.

Figure 5:
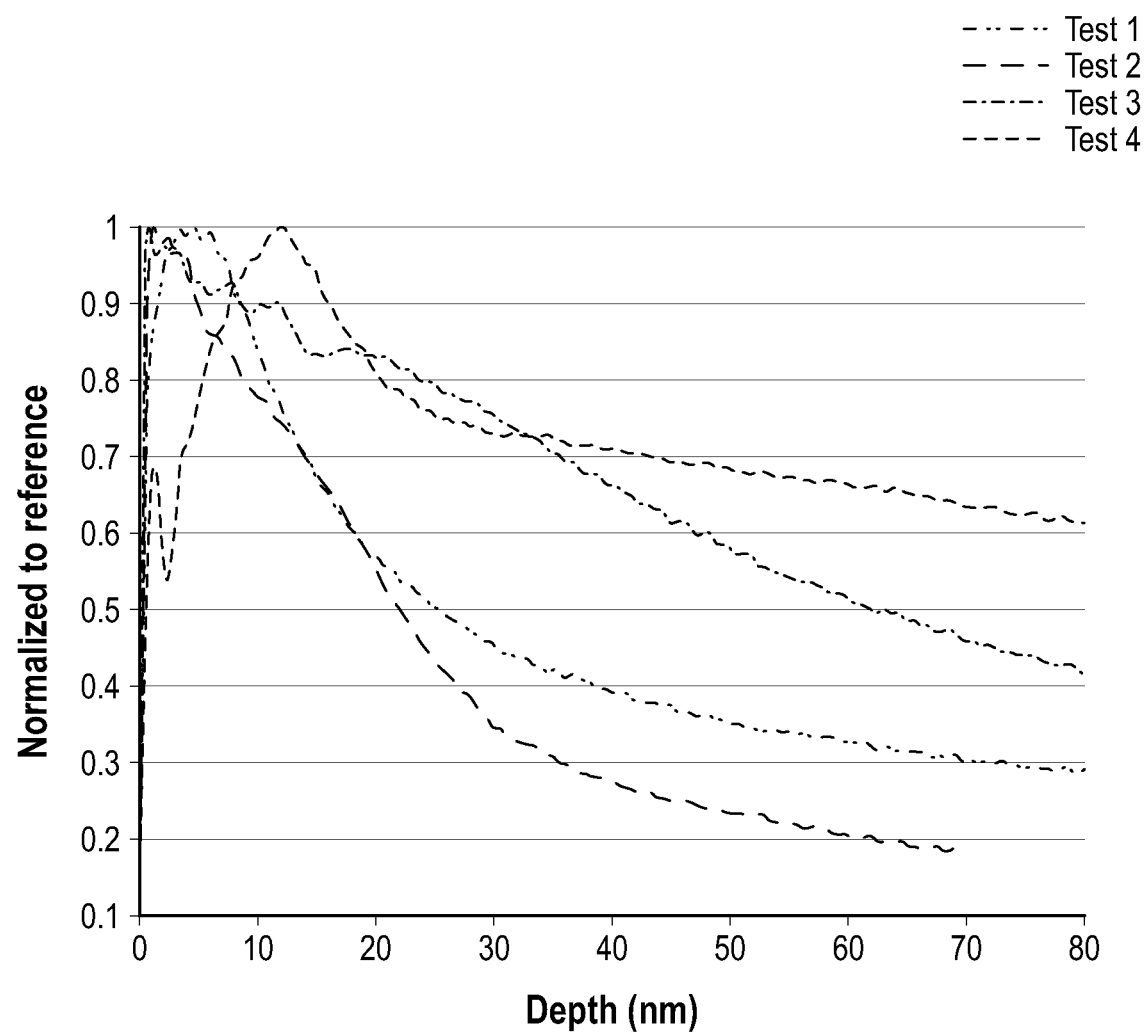
FIG. 5 illustrates a TOF-SIMS signature for a particle obtained from various testings.

FIG. 5 is a graph illustrating the oxygen profile comparison between different samples by TOF-SIMS. The TOF-SIMS signature of powder is obtained for Test 1 to 4. The presence of a depletion layer can be associated with the high flowability powders as can be seen in Table 1.

The TOF-SIMS signature of a fine powder that has been treated can be clearly seen from the FIG. 5. A tail in the oxygen content enters deeper in the surface layer. It is critical to obtain this depletion layer with a certain critical depth in order to get the improved flowability behavior. The TOF-SIMS results suggest that the depletion layer has a depth of the order of 100 nm. The depth can be estimated by calibrating the sputtering rate of the ion beam obtained on a Ti—6Al—4V bulk part with a profilometer. The sputtering rate depends of the ion beam intensity and of the type of material. The calibration is done prior to measurements and the ion beam energy is very stable.

TABLE 1

Test 1 to 4 description with flowability and apparent density measured on a 15-45 µm particle size distribution

| Lot # | Additive gas Concentration (ppm) | Flowability (s) | Apparent density (g/cm³) | Visual compaction in the collection bucket after atomization |
|---|---|---|---|---|
| Test 1 | 0 | NF | NA | bad |
| Test 2 | 0 | NF | NA | bad |
| Test 3 | 80 ppm air | 27.3 | 2.51 | good |
| Test 4 | 50 ppm O2 | 27 Per ASTM B213 | 2.50 Per ASTM B212 | good |

TABLE 2

Powder chemical composition of Test 1 to 4 on a 15-45 µm particle size distribution

| | Chemical Composition (wt. %) | | | | | | | |
|---|---|---|---|---|---|---|---|---|
| Lot # | O | N | H | C | Fe | Al | V | Ti |
| Test 1 | 0.102 | 0.007 | 0.0043 | 0.008 | 0.13 | 6.35 | 3.94 | 88.94 |
| Test 2 | 0.094 | 0.01 | 0.0022 | 0.016 | 0.21 | 6.37 | 3.91 | 88.85 |
| Test 3 | 0.084 | 0.025 | 0.0016 | 0.01 | 0.21 | 6.39 | 3.87 | 88.87 |
| Test 4 | 0.112 | 0.005 | 0.0084 | 0.011 | 0.13 | 6.33 | 3.82 | 89.03 |
| | Per ASTM E1409 | Per ASTM E1447 | Per ASTM E1941 | | Per ASTM E2371 | | | |

TABLE 3

Particle size distributions of Test 1 to 4 on a 15-45 µm particle size distribution

| | Particle size distribution (wt. %) | | | | | | | |
|---|---|---|---|---|---|---|---|---|
| Lot # | >53 | >45 | ≤45 > 25 | <25 | Total | D10 | D50 | D90 |
| Test 1 | 0 | 2.2 | 80.6 | 17.2 | 100 | 20.9 | 33.0 | 43.6 |
| Test 2 | 0.5 | 1.5 | 72.2 | 25.8 | 100 | 21.4 | 33.3 | 44.7 |
| Test 3 | 0.1 | 2.2 | 71.9 | 25.8 | 100 | 22.5 | 33.7 | 44.3 |
| Test 4 | 0 | 3.0 | 69.0 | 28.0 | 100.0 | 22.6 | 34.1 | 45.5 |
| | Per ASTM B214 | | | | | Per ASTM B822 | | |

It was determined from statistical data analysis of many batches that the injection of air (Test 3) adds about 100-150 ppm of nitrogen and about 50 ppm of oxygen to the powder. The injection of air improved flowability of the formed reactive metal powder.

It was further determined from statistical data analysis that injection of only $O_2$ (Test 4) adds about 150-200 ppm of oxygen and no nitrogen.

Additional successful tests on the flowability of 15-45 µm particle size distribution have been carried by injecting water vapor. Improvement of flowability of 15-45 µm particle size distribution was also observed.

The treatment performed maintains a satisfying chemical composition according to the composition of standard ASTM B348, ASTM F2924 and ASTM F3001. It would have also complied with those of AMS 4998 if the oxygen of the raw material would have been slightly higher.

Figure 6:
FIG. 6 is a photograph of a batch of metal powder formed according to an atomization process that does not include the step of contacting with an additive gas.

FIG. 6 is a photograph of a batch of about 100 kg of metal powder formed according to an atomization process that does not include contacting with the additive gas. Due to agglomerates, 90% of the collecting bucket is filled and the visual compaction is bad.

Figure 7:
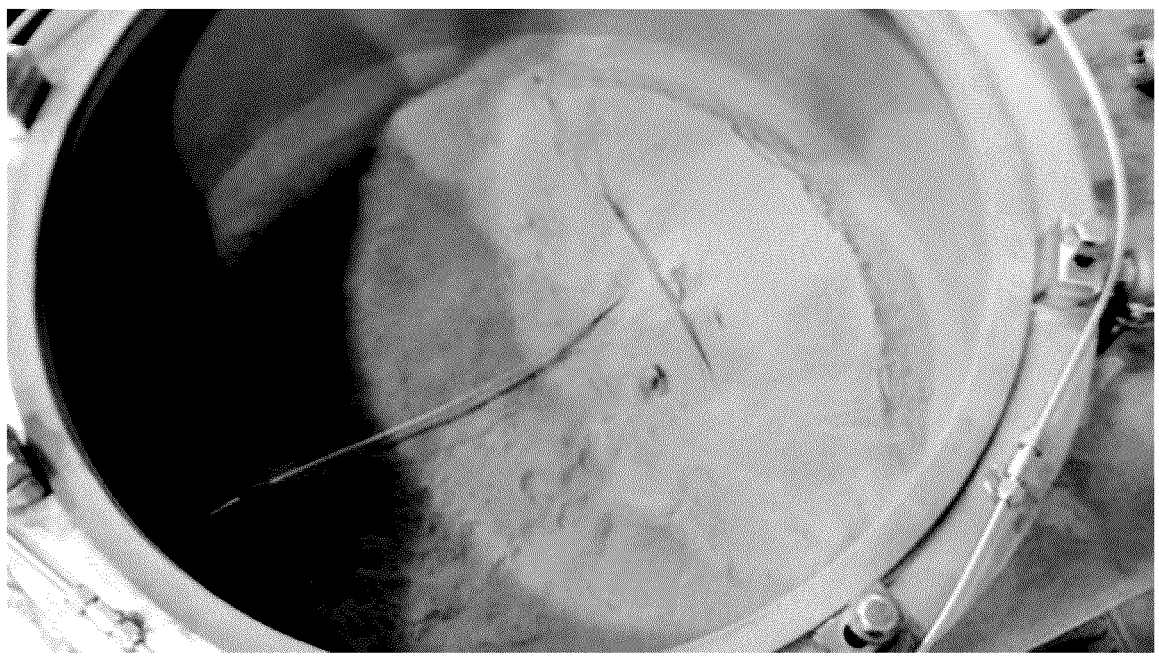
FIG. 7 is a photograph of a batch of metal powder formed according to an atomization process in which the metal source has been contacted with an additive gas.

FIG. 7 is a photograph of a batch of about 100 kg of metal powder formed according to an atomization process in which the metal source is contacted with the additive gas.

Due to improved flowability and lower surface interactions between particles, 20% of the collecting bucket is filled for the same amount of material as used during the run of FIG. 6 and the visual compaction is good.

Tests similar to Test 3 and 4 have been carried by intermittently injecting the additive gas. It was found that the treatment was still effective while having the advantage of adding less impurity to the final product.

Similarly, we showed that a mixture of up to 30% of powder with good flowability can be blended with 70% of powder that did not flow in Hall flowmeter and the resulting powder was still flowing even if not as well as the starting powder.

EXPERIMENT 2

Heat treatment was performed a posteriori on already-formed metal powder that was formed from a process in which additive gas was not used.

More specifically, the already-formed metal powder was heated in air atmosphere at about 250° C. for 12 hours. It was expected that this heating would cause addition of oxygen to surface of particles of the raw metal powder and increase the thickness of the native oxide layer.

It was observed that oxidation/nitridation a posteriori did not produce a similar result to that of contacting the additive gas in the atomization zone of an atomization process. The improvement of the flowability of the metal powder was not observed.

It seems that a posteriori heating of already-formed metal powder will only thicker the native oxide layer and did not have the ability to provide a sufficient deep and depletion oxide/nitride layer on the particle. The thicker oxide layer will also remain quasi stochiometric and will not be able to provide the positively charged layer 1 which is provided by the depletion layer.

Without being bound to the theory, the high temperature involved during the atomization and the low concentration of additive gas enable the oxidation/nitridation reaction that forms the depletion oxide/nitride layer when the metal source is contacted with the additive gas.

Embodiments of paragraphs [0027] to [00192] of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combination, when applicable, between the embodiments of paragraphs [0027] to [00192] and the processes of paragraphs [0006] to [0026] are hereby covered by the present disclosure.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. A reactive metal powder atomization manufacturing process comprising:
    forming an atomization mixture comprising an atomizing gas and an additive gas, the additive gas being present in a concentration of 80 parts per million (ppm) or less, the additive gas being an oxygen-containing gas; and
    atomizing a heated reactive titanium alloy source to produce a raw reactive powder of titanium alloy particles, wherein atomizing the heated reactive titanium alloy source comprises contacting said heated reactive titanium alloy source with the atomization mixture, the raw reactive powder comprising a powder having a particle size distribution of 10 to 53 micrometers with a flowability less than 40 s, measured according to ASTM B213.

2. The reactive metal powder atomization manufacturing process of claim 1, wherein forming the atomization mixture further comprises deliberately adding the additive gas.

3. The reactive metal powder atomization manufacturing process of claim 1, wherein forming the atomization mixture further comprises deliberately adding an amount of the additive gas in excess of an inherent amount of additive gas.

4. The reactive metal powder atomization manufacturing process of claim 1, wherein the raw reactive powder contains less than 1800 ppm of oxygen according to AMS 4998.

5. The reactive metal powder atomization manufacturing process of claim 1, wherein the titanium alloy particles are Ti—6Al—4V particles.

6. The reactive metal powder atomization manufacturing process of claim 1, wherein the raw reactive powder has a flowability less than 30 s, measured according to ASTM B213.

7. The reactive metal powder atomization manufacturing process of claim 1, wherein the raw reactive powder comprises a powder having a particle size distribution of 25 to 45 μm having a flowability less than 40 s, measured according to ASTM B213.

8. The reactive metal powder atomization manufacturing process of claim 1, wherein the raw reactive powder has a flowability less than 28 s, measured according to ASTM B213.

9. The reactive metal powder atomization manufacturing process of claim 1, wherein the titanium alloy particles are Ti—6Al—4V particle, wherein the additive gas contains nitrogen, and wherein the raw reactive powder contains less than 400 ppm of nitrogen according to AMS 4998.

10. The reactive metal powder atomization manufacturing process of claim 1, wherein the titanium alloy particles are Ti—6Al—4V particle, wherein the additive gas contains carbon, and wherein the raw reactive powder contains less than 1000 ppm of carbon according to AMS 4998.

11. The reactive metal powder atomization manufacturing process of claim 1, wherein the titanium alloy particles are Ti—6Al—4V particle, wherein the additive gas contains hydrogen, and wherein the raw reactive powder contains less than 120 ppm of hydrogen according to AMS 4998.

12. The reactive metal powder atomization manufacturing process of claim 1, wherein the titanium alloy particles are Ti—6Al—4V particle, wherein the additive gas contains chlorine, and wherein the raw reactive powder contains less than 1000 ppm of chlorine according to AMS 4998.

13. The reactive metal powder atomization manufacturing process of claim 1, wherein the atomizing gas is provided from at least one plasma source.

14. The reactive metal powder atomization manufacturing process of claim 1, wherein the additive gas is present in a concentration in a range from 50 ppm to 80 ppm.

15. The reactive metal powder atomization manufacturing process of claim 5, wherein the raw reactive powder contains less than 1800 ppm of oxygen according to AMS 4998.

16. The reactive metal powder atomization manufacturing process of claim 5, wherein the additive gas is air.

17. The reactive metal powder atomization manufacturing process of claim 5, wherein the additive gas is $O_2$.

* * * * *